United States Patent Office 3,661,751
Patented May 9, 1972

1

3,661,751
CORROSION RATE METER
Homer M. Wilson, Houston, Tex., assignor to
Petrolite Corporation, St. Louis, Mo.
Filed Oct. 30, 1969, Ser. No. 872,694
Int. Cl. G01n 27/46
U.S. Cl. 204—195　　　　　　　　　　　　16 Claims

ABSTRACT OF THE DISCLOSURE

A corrosion rate meter with test specimen, reference and third electrodes contactable by a corrodent. An isolation amplifier provides an output signal representative of the potential difference between the test and reference electrodes. An output amplifier produces output current having a predetermined relationship to this output signal and a reference current signal representing a certain polarization potential to be established between the test and reference electrodes. A signal correction means stores an integrated corrective signal derived from the current from the output amplifier. The corrective signal adjusts the output signal of the isolation amplifier for a component representing the potential difference between the test and reference electrodes but not the polarization potential component which removes the reference current signal. Then, the output amplifier passes current between the test and third electrodes to produce a polarization potential between the test and reference electrodes. The output signal from the isolation amplifier is now free of both corrective signal components to control the output amplifier to that current magnitude creating the certain polarization potential between the reference and test electrodes. A readout means measures the output current from the output amplifier which is representative of the corrosion rate occurring at the test electrode.

BACKGROUND OF THE INVENTION (1) Field of the invention

This invention relates to measuring and testing corrosion processes and it relates particularly to the instruments and electro-chemical techniques used in the study of corrosion processes.

(2) Description of the prior art

It is often desirable to determine the rates at which metals corrode within a corrodent such as a corrosive liquid. For example, corrosion inhibitors are added to aqueous liquids to reduce the corrosion of exposed metals. Instruments are used to measure the rate at which these metals corrode so that the effectiveness of the inhibitor can be determined. The measure of the rate of corrosion upon metals usually involves an instrument associated with a probe carrying electrodes immersed within the corrodent. These instruments are usually termed "corrosion rate meters." The electrodes in the corrodent undergo certain electro-chemical changes that are related to the corrosion of the specimen forming the test electrode. The rate of corrosion can be correlated with the electro-chemical effects upon the test (specimen) electrode contacted by the corrodent.

The corrosion of metallic materials by a corrodent causes the dissipation of electrical energy by electro-chemical action. For example, two metallic electrodes immersed in a corrodent develop a potential difference as a result of half-cell effects. The potential at a freely corroding test electrode (no external current application) in a dynamic system were the corrosion products are either diffusing or dissolving, eventually reaches a relatively steady-state potential differential relative to a reference electrode. This potential difference may be termed the "freely corroding potential" of the test electrode forming the half-cell subjected to the corrodent. A test electrode, which is subject to corrosion, may be polarized into a non-corroding state by passing direct current from an external source between the electrode and corrodent. The amount of current-induced change in the electrical potential of the test electrode, with respect to a reference electrode, is termed as "polarizing potential." The polarizing potential may be anodic or cathodic, depending upon the directional flow of current which produces the polarization potential. Correlation of the polarization potential increments against the applied current increments may be used to determine the rate of corrosion of the test electrode subject to corrosion action.

An electro-chemical process and apparatus, especially useful in measuring corrosion rates, is described in U.S. Pat. 3,406,101. In this patent, there is described a corrosion rate meter which includes a probe having three electrodes adapted to be exposed to a corrodent such as a corrosive liquid, an adjustable current source, an ammeter and a high impedance voltmeter as primary components. The adjustable current source applies a small electric current between a "test" electrode and an "auxiliary" or third electrode. At the same time, the voltmeter monitors the polarization potential produced by current flow between the test electrode and a reference electrode. The current flow slightly polarizes the surface of the test electrode, and as a result, causes a shift in potential (polarization potential) between the test and reference electrodes. The current flow required to produce a certain desired polarization potential (usually about 10 millivolts) is directly proportional to the corrosion rate of the test electrode undergoing corrosion. Usually, the polarization is selected within the linear voltage corrosion rate environmental conditions, and good results have been obtained with between 5 and 20 millivolts but preferably 10 millivolts, polarization.

If the corrosion rate is low, a very small current flow will polarize the test electrode. If the corrosion rate is high, more current flow is required to polarize the test electrode. The weight loss of metal lost from the test electrode (by electro-chemical corrosion) is directly proportional to the current flow in accordance with Faraday's law. Thus, by use of appropriate constants and adjustments of the surface area of the test electrode, the ammeter can be calibrated directly into any desired units of corrosion rate providing the surface area of the test electrode exposed to corrosion can be adjusted to the desired range. In order to provide symmetry of the probe, and for other reasons, the exposed surface area of all electrodes is usually made identical. Thus, if the electrodes are constructed identically of the same material, such as 10–20 mild steel, any of the electrodes may serve as the auxiliary, test and reference functions in the electro-chemical techniques for determining the rate of corrosion.

In corrosion rate meters of the type described in the mentioned patent, the amount of current which flows between the test and third electrodes to produce a certain polarization potential is measured to determine the rate of corrosion occurring at the test electrode. Any potential differences, such as the freely corroding potential, present between the test and reference electrodes, other than the polarizing potential, produce erroneous results in corrosion rate determinations. Obviously, these instruments can produce highly accurate results when a correction is made for the non-polarizing potential differences between these electrodes, principally the freely corroding potential, which may exist between these electrodes before, and also during, application of the polarizing current. Additionally, in these instruments correction for the freely corroding and other potentials must be made without effecting the impedance between the reference and test electrodes immersed within the corrodent. Otherwise, a constant polarizing current will produce corresponding variations in polarization potential to be developed between these electrodes.

Corrosion rate meters employing controlled current flow for producing a certain polarization potential between electrodes, may employ a manual adjustment to remove the freely corroding potential component from the total potential difference between the test and reference electrodes. As a result, only the polarization potential will be the measure of when the controlled current is at the exact magnitude to provide a correct measurement of corrosion rate occurring at the test electrode. However, rather significant changes in the magnitude of the freely corroding potential, and also the impedance between the reference and test specimen electrodes, can occur over a short time interval during such manual adjustment. Then, the ultimate accuracy of the measurement of corrosion rate with these instruments can not be obtained in rapidly changing environments. Additionally, manual adjustments must be made for each set of electrodes with which the instrument is employed, and at closely spaced time intervals so that most accurate results in measurement of corrosion can be obtained.

The required correction for the freely corroding potential in the controlled current type of corrosion rate meters becomes a serious obstacle when switching devices are employed so that a single corrosion rate meter monitors a plurality of widely spaced apart probes, each probe carrying test, reference and third electrodes. For example, consider the problem in monitoring the corrosion occurring at 10 probes in various aqueous streams in a refinery or chemical plant at a distance of a mile from the corrosion rate meter. Each probe is connected sequentially to the corrosion rate meter. However, each monitored probe requires a correction in the corrosion rate meter to compensate for the freely corroding potential at the test electrode. Then, the desired accurate measurement is made by adjusting current flow until a certain polyarization occurs at the electrodes. Preforming cathodic and anodic measurement of corrosion rate at each probe immediately doubles the number of operational steps required with the manually adjusted instrument. Therefore, an automatic system is desired to perform the necessary correction for the freely corroding potential.

The corrosion rate meter can employ suitable circuitry to provide automatically an equal but opposing potential for removing the freely corroding potential from the circuit including the test and reference electrodes. The freely corroding potential is usually less than 100 millivolts and frequently is about the same magnitude as the certain polarization potential (generally 10 millivolts) to be established by controlled current between these electrodes. Thus, the input potential correcting circuitry is required to sense and then automatically remove a potential of a very small magnitude from substantially the same magnitude of the certain polarization potential to be established between these electrodes. The resistance of the conductors interconnecting each probe with the corrosion rate meter becomes significant at distances of a 1000 feet or more. Resistance in these conductors produces an IR potential in the conductor connected to the test electrode that is summed with the freely corroding potential at the electrodes and should be removed by the same correction circuitry. However, this resistance induced potential is a function of the polarizing current passing through the conductor to the test electrode. As a result, the resistance-induced potential varies with current magnitude. Therefore, non-correctable errors can be introduced into the measurement of corrosion rate.

In one automatic correcting type of corrosion rate meter using the controlled current mode of operation, an integrator was employed in conjunction with a voltage follower connected to the electrodes for driving an amplifier to produce a corrective potential equal to the freely corroding potential at the input of the voltage follower. This arrangement reduced the output of the voltage follower to zero error signal with only the freely corroding potential appearing between the test and reference electrodes. In "null" operations, a reference current was applied into the input of the voltage follower to produce an input signal equal to the certain polarization potential (about 10 milli-volts). The integrator produced an equal but opposing current in the input of the voltage follower which removed the input signal component representing the certain polarization potential. A capacitor in the integrator stored both components of the corrective signal applied to the input of the voltage follower. In "operate" operations, the output of an output amplifier was applied to the third electrode while the reference current was removed from the input circuit of the voltage follower. As a result, the integrator provided in the input of the voltage follower an opposing freely corroding potential and the certain polarization potential. The output of the voltage follower drove the output amplifier until that current magnitude was passed between the electrodes to produce approximately an opposing polarization potential at the input of the voltage follower. A readout device indicated the current flow which was a measure of corrosion rate. Although this automatic corrosion rate meter performed satisfactorily, inaccuracies arose from establishing the opposing freely corroding potential and the polarization potential directly in the high impedance input circuit, at high gain conditions, of the voltage follower. Additionally, the output-input circuit between the voltage follower and output amplifier did not respond identically to signals during the "null" and "operate" conditions. The introduction of the reference current signal directly into the input of the voltage follower resulted in a change of input impedance so that the output signal applied to the output amplifier did not maintain a predetermined relationship to the certain polarization potential in both "null" and "operate" conditions. Obviously, any resistance induced potential in the conductors connecting each probe to the input of the voltage follower caused erroneous results since the voltage follower produced an error signal representative of all such potentials other than components representing the freely corroding potential and the certain polarization potential in the input circuit of the voltage follower.

The above deficiencies lead to the development of the corrosion rate meter of the present invention. Therefore, it is the purpose of the present invention to provide a corrosion rate meter which overcomes the above listed problems and fulfills the need for an automatic "nulling" and "operating" instrument. In particular, the present corrosion rate meter accurately measures and automatically corrects for the freely corroding potential and calibrates for the certain polarization potential which exist between the reference and test electrodes during corrosion rate determinations.

SUMMARY OF THE INVENTION

In accordance with the one aspect of this invention, there is provided a corrosion rate meter for determining the rate of corrosion by means of polarization measurements in a corrodent. The meter employs a plurality of electrodes adapted to be placed into contact with the corrodent, one electrode being the test specimen. At least two electrodes, one being the test specimen, are connected in an input circuit to an isolation amplifier which produces in its output circuit an output signal representative of the potential difference between these electrodes. The output signal is applied through a control impedance to a source of direct current, including an output amplifier having an output circuit producing current having a predetermined relationship to the output signal from the isolation amplifier. The current from the output amplifier is selectively connected in a first circuit to a signal correction means and in a second circuit to at least two electrodes, one being the test specimen. The output current in the second circuit creates at the input circuit of the isolation amplifier, a polarization potential between these electrodes in addition to their freely corroding potential. A source of reference current signal is selectively applied to the input of the output amplifier to produce in the first circuit a component in the output current representative of a certain polarization potential to be established between the electrodes connected in the input circuit of the isolation amplifier. This output current is applied to a signal correction means for integrating and storing a corrective signal containing components having a predetermined ratio to the freely corroding potential of the electrodes and the certain polarization potential to be created between the electrodes. The corrective signal is applied from the signal correction means to the isolation amplifier for adjusting its output to remove therefrom any signal component representing the freely corroding potential. With the reference current signal applied to the output amplifier connected in the first circuit to the signal correction means, the corrective signal produces a first output signal from the isolation amplifier representative of the certain polarization potential between the electrodes. The first output signal is applied through the control impedance for removing the reference current signal from the input of the output amplifier. With the reference current signal removed from the output amplifier connected in the second circuit to the electrodes, the corrective signal produces in the output of the isolation amplifier a second output signal from which is removed any signal components representing the freely corroding potential. With the certain polarization potential between the electrodes. The second output signal is applied through the control impedance to produce a signal to the input of the output amplifier to control its output current in the second circuit to the electrodes to effect the certain polarization potential therebetween. Readout means measure the output current in the second circuit which creates the polarization potential between the electrodes, one being the test specimen.

BRIEF DESCRIPTION OF THE DRAWINGS

FIG. 3 is an illustration of a recorder and chart typically employed with the circuitry of FIG. 2;

FIGS. 4 and 5 are schematic wiring diagrams, respectively, of a source of direct current and reference voltages for the circuitry of FIG. 2; and FIG. 6 is an enlarged illustration of a chart produced in the recorder of FIG. 3 by automatic sequencing operation of the circuitry of FIG. 2.

DESCRIPTION OF SPECIFIC EMBODIMENTS

Figure 1:
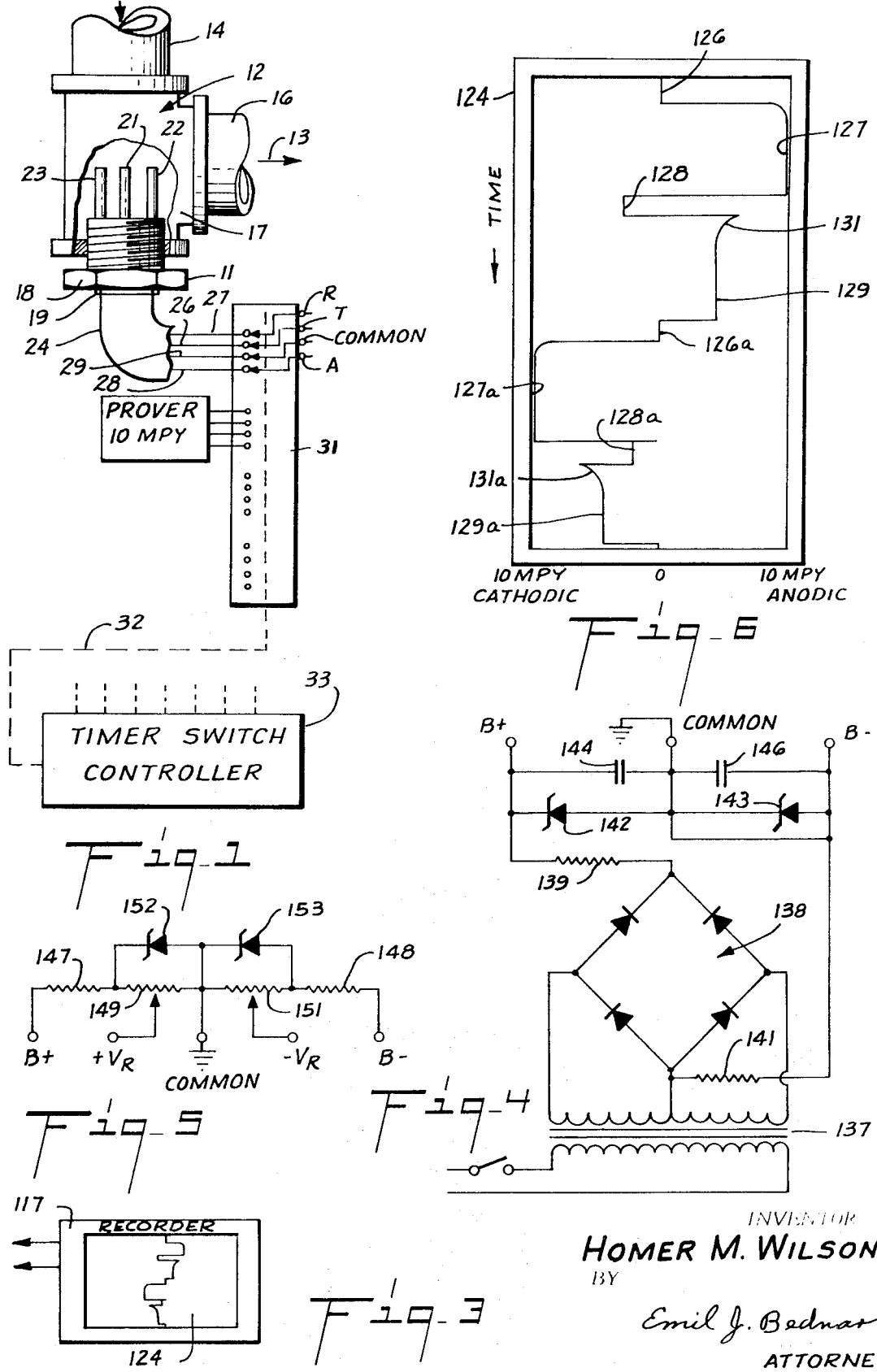
FIG. 1 is a perspective veiw of the piping system which includes a corrosion rate meter probe carrying a plurality of metallic electrodes interconnected by a cable to a switching assembly on which a "Meter Prover" is also connected.

Referring now to FIG. 1, there is illustrated a probe 11 contained in a piping system 12 which conveys a corrodent, such as an aqueous fluid, in the direction indicated by the arrow 13. The piping system 12 includes a pair of pipes 14 and 16 interconnected by a T 17 to which the probe 11 is threadedly connected. The probe 11 may be constructed of any suitable form, such as the structure illustrated in U.S. 3,406,101. As illustrated, the probe 11 has a metallic body formed of pipe plug 18 carrying on insulators electrodes 21, 22, and 23 electrically isolated from the body. The electrodes are connected by conductors (not shown) within the plug 18 to an electrical connector 19. A cable 24 connects at one end to the connector 19 of the probe 11 to provide distance-spanning electrical interconnection to circuitry of the corrosion rate meter shown in FIG. 2. More particularly, the cable 24 contains electrical conductors 26, 27, 28 and 29 interconnected to position 1 of a multiposition terminal strip in switching assembly 31. The electrodes 21, 22 and 23 are connected to conductors 26, 27 and 28, respectively. In addition, conductor 29 also connects to the electrode 21 to provide a separate current path to the circuit or ground, or common (comm), terminal of the circuitry of the corrosion rate meter.

Preferably, the electrodes 21, 22 and 23 are structurally identical for purposes of the present electro-chemical technique. For purposes of the present description, the electrodes 21, 22 and 23 provide "test," "reference," and "auxiliary" or "third electrode" functions respectively. The electrode 21 for the precise determination of corrosion rate of a certain steel, should be made of this certain steel. Although the electrodes will usually be metallic, they can be formed of any substance capable of placing ions into solution in a corrodent. It will be apparent that the probe 11 may carry any number of electrodes which by proper switching and electrical connections provide the necessary functions for carrying out the measurement of corrosion rate.

Switching assembly 31 may be of any suitable form. Preferably, it is a multi-pole, multi-position switch actuated by a stepping relay, or other actuator, indicated by dashed line 32. The probe 11 is electrically interconnected in the switching assembly 31 to one set of terminals at position 1. Movable contacts interconnect selectively the several terminal positions to external circuit terminals designated "R," "T," "Comm" and "A." Other probes may be connected to one or more of the remaining terminal positions 2, 3 or 4 on the switching assembly 31. A standardizing device, commonly called a "Meter Prover" is shown connected in terminal position 2 of the switching assembly 31. The Meter Prover is a resistance network representing the electrical function of the probe 11 when corrosion occurs at the test (mild steel) electrode 21 at 10 mils per year (MPY). Switching assembly 31 can be actuated by any suitable device but preferably is integrated into the other switching functions of the corrosion rate meter by a timer-switch controller 33. The controller 33 may be of any suitable form such as a clock or timer driven rotary switch adapted to produce simultaneously, or in succession, a plurality of switch actuating functions, such as closing or opening relays, or mechanically opening or closing switch contacts in the circuitry shown in FIG. 2. It will be apparent that the switching functions provided by the controller 33 may be arranged readily in any desired sequence and sequence duration by one skilled in the art.

Figure 2:
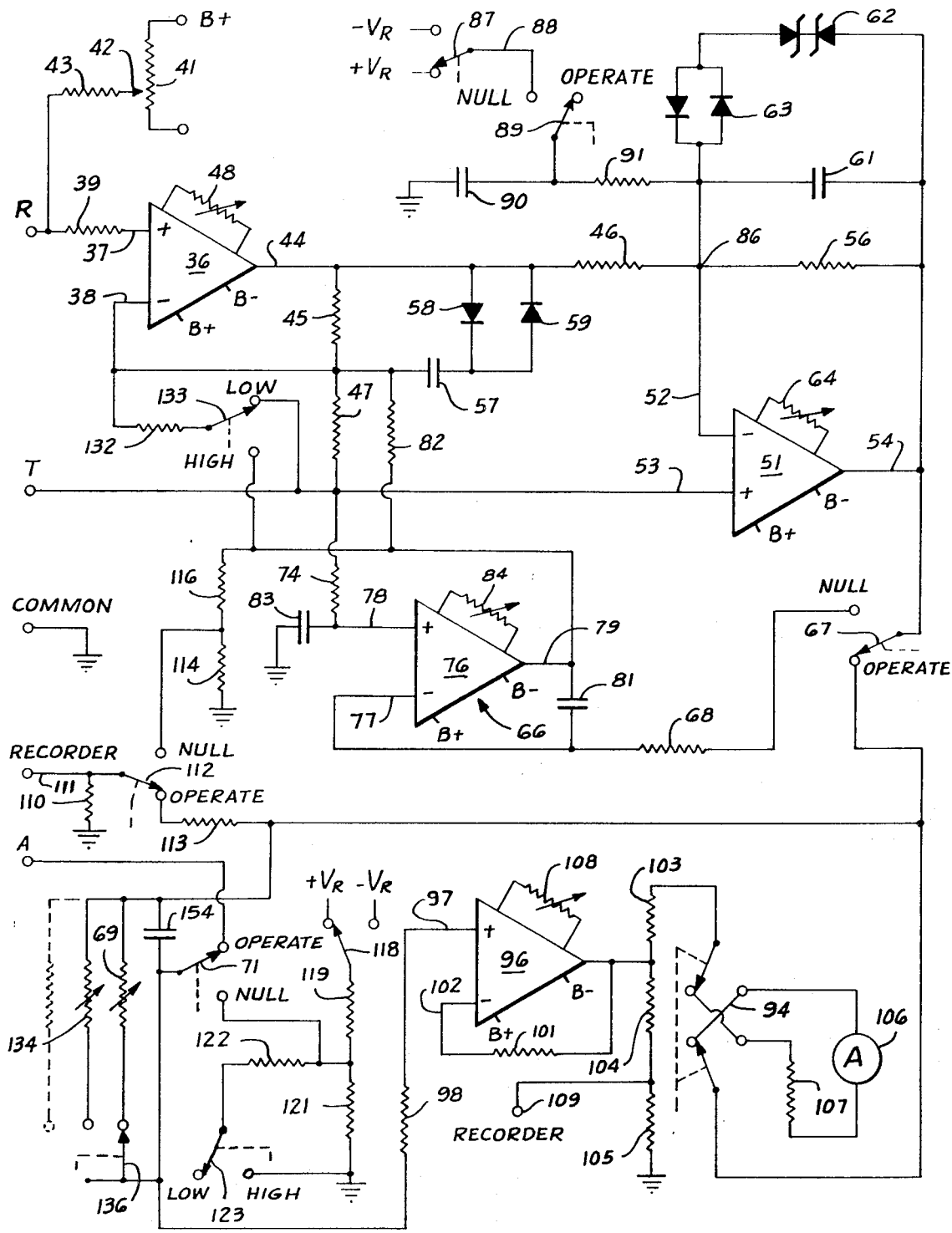
FIG. 2 is a schematic wiring diagram of one embodiment of a corrosion rate meter of this invention connected to the probe shown in FIG. 1.

Referring now to FIG. 2, there is illustrated circuitry of one embodiment of the corrosion rate meter of the present invention. Electrodes 21, 22 and 23 on the probe 11 interconnect through the conductors 26 through 29 and switching assembly 31 to terminals R, T, A and Common (or Comm) of the circuitry. The circuitry includes an isolation amplifier 36 with an input circuit connected in a voltage loop between the test electrode 21 and the reference electrode 22. The isolation amplifier 36 is a voltage follower having a high impedance input circuit for isolating the electrodes 21 and 22 from the remainder of the circuitry. Preferably, a differential input, operational amplifier is used as the voltage follower. In this case, the amplifier 36 has a first input 37 and a second input 38 connected, respectively, to the terminals R and T. The input 37 connects to the terminal R through a current limiting resistor 39. A potentiometer 41 connects to a source of nulling voltage which may be a battery (not shown) connected across terminals B+ and B−. Moveable arm 42 of the potentiometer 41 is connected through a series resistance 43 to the terminal R. The arm 42 provides a variable nulling current to the input 37 to remove any amplifier input current which might flow through the electrode 22. With the electrodes 21, 22 and 23 disconnected from the terminals R, T and A, the arm 42 on the potentiometer 41 is adjusted for a steady-state zero output signal from the isolation amplifier 36. Thus, input 37 is at zero input current under these conditions and when the amplifier 36 is "nulled."

The amplifier 36 has an output 44 connected by a feedback circuit to the input 38. More particularly, the feedback circuit includes the resistor 45 to provide gain control for the amplifier 36. The resistor 45 establishes a gain for the amplifier 36 sufficient to operate an output amplifier connected to the output 44. A component gain of about 50,000 in the amplifier 36 will usually be satisfactory. The input 38 connects through a common impedance, such as resistor 47 to the terminal T. The resistor 47, in conjunction with the feedback circuit, provides a common signal path between the input 38 and the terminal T. Thus, the total potential difference between the terminals R and T will appear as a function voltage across resistor 47.

The amplifier 36 is connected to a source of current, such as the power supply illustrated in FIG. 4, connected to the terminals B+ and B—. A trim resistor 48 on the amplifier 36 compensates for static or non-signal voltages which may be present in its associated input-output circuits. It will be apparent that the amplifier 36 is a non-inverting voltage follower. The input signal voltage present between the terminals R and T produces a potential difference between the inputs 37 and 38. As a result, the amplifier 36 will drive to produce an output signal (in its output 44) representative of this potential difference.

The output signal from the amplifier 36 is applied through a control impedance, such as resistor 46 to an input 52 of an output amplifier 51. The output amplifier 51 may be of any suitable form capable of producing in its output circuit, an output current which has a predetermined relationship to the output signal from the isolation amplifier 36 applied through control resistor 46. More particularly, the amplifier 51 may be a differential input operational amplifier having the first input 52 connected to the resistor 46 and a second input 53 connected to the terminal T. A feedback circuit connects the input 52 of the amplifier 51 to its output 54. The feedback circuit includes a feedback resistor 56 to control the gain of the amplifier 51. The resistor 56 establishes a gain for the amplifier sufficient to produce an output current magnitude for producing the certain polarization potential between the electrodes connected to terminals R and T of the circuitry. A component gain of above about 20,000 in the amplifier 51 will usually be satisfactory. In the usual measurement of corrosion, the output 54 of the output amplifier 51 should be able to produce an output current up to approximately 5.5 milliamperes. Thus, the output amplifier 52 can be a high gain voltage or current amplifier, or a power amplifier.

The input 52 of the amplifier 51 is decoupled, as to non-D.C. signals, from the output 44 of the amplifier 36 by a capacitor 57 in series with diodes 58 and 59 arranged in parallel, front-to-back relationship. The capacitor and these diodes also provide negative A.C. feedback voltage from the output 44 of the amplifier 36 for stabilizing its operation. The feedback resistor 56 is shunted by capacitor 61 to provide a peak clipping of spikes derived from the output signal of the amplifier 36. In addition, a pair of series connected, back-to-back arranged Zener diodes 62 are placed in series with a pair of diodes 63 arranged in parallel, front-to-back relationship. As a result, the peak potential at which the output 54 may swing is set to prevent saturation of the amplifier 51. For example, a maximum limit of about 10 volts across the feedback resistor 56 prevents the amplifier 51 from going into saturation at high level signals applied to the input 52. It will be apparent that the output amplifier 51 is an inverting amplifier relative to the output signal from the amplifier 36.

The output 54 of the amplifier 51 selectively interconnects in a circuit to a signal correction means 66 and in a second circuit to the third electrode 23 at terminal A with the current loop from the electrode 21 returned by conductor 29 to the common terminal. More particularly, the output 54 is selectively applied by the switch 67 in a "null" position through a signal developing resistor 68 to the signal correction means 66. With the switch 67 in the "operate" position, the output current from the output 54 passes through a range setting resistance 69 and switch 71 in the "operate" position to terminal A of the circuitry. The switch 71 in a "null" position connects the second circuit to an attenuating resistor network. A signal current applied to the input 52 of the amplifier 51 produces an output current flow in the output 54. The various circuitry components surrounding the amplifier 51 are arranged so that the current flow in output 54 is in a suitable range to provide the certain polarizing potential at the electrodes 21 and 22. The output signal from the output 44 of the amplifier 36 is converted in the resistor 46 to a current signal which controls the output amplifier 51. Therefore, the voltage output signal from the isolation amplifier represents a certain current signal in the input 52 of the current amplifier 51. For example, the freely corroding potential at terminals A and T produces a certain output signal from amplifier 36 which controls the amplifier 51 so that it provides an output current that would polarize the test electrode 21 to exactly the freely corroding potential.

The amplifier 51, as part of a source of direct current to terminal A, is connected to a suitable source of current such as the power supply shown in FIG. 4, connected between terminals B+ and B—, respectively. A trim resistor 64 may be employed with the amplifier 51 for balancing the static or non-signal voltages which may be present in its associated input-output circuitry.

The signal correction means 66 may take any suitable form but preferably includes a differential input, operational amplifier 76 having a first input 77 connected through the resistor 68 and the switch 67 to the output 54 of the amplifier 51. A second input 78 of the amplifier 76 connects through a resistor 74 to the terminal T of the circuitry. The amplifier 76 having a component gain of above about 50,000 with a feedback circuit connecting its output 79 to the input 77. This feedback circuit includes a capacitor 81 as the "memory" in which a correction signal is stored. More particularly, output current through the resistor 68 generates a signal at the input 77 which is converted by the amplifier 76 into a control signal that is stored in the capacitor 81. This control signal has a predetermined ratio to the output voltage signal from the amplifier 51 on the resistor 68.

It will be apparent that the amplifier 76 is an inverting signal generating means which provides the control signal. The amplifier 76 has its output 79 connected through a coupling resistor 82 to the input 38 of the amplifier 36. Thus, the control signal establishes a current from the output 79 of the amplifier 76 through the resistor 47. This current in the resistor 47 is the corrective signal applied to the amplifier 36 which is equal to the signal between terminals R and T.

In addition to the described circuit elements associated with the integrating amplifier 76, the input 78 is shunted to circuit ground, or terminal common with a capacitor 83 to remove non-D.C. signals. The amplifier 76 is equipped with the usual trim-resistor 84 and connection to a suitable source of current, such as the power supply of FIG. 4, connected at terminals B+ and B—.

With the switch 67 in the "null" position, the signal correction means 66 operates in the following manner. The freely corroding potential (and includes IR potentials) appears between terminals R and T and likewise at input 37 of the amplifier 36. As a result, an output signal representative of this potential difference appears in output 44, which output signal is converted in the control resistor 46 into a current signal. This current signal applied to the input 52 of the output amplifier 51 produces an output current having a predetermined relationship to this potential difference. This current generates a voltage signal in the resistor 68 to create in integrating amplifier 76 of a control signal at output 79 and which also is stored in capacitor 81. This control signal produces a certain current through the resistor 47 that develops the corrective signal (as a potential) across the resistor 47 and at input 38. This corrective signal is equal in magnitude to the freely corroding potential between terminals R and T (input 37).

At this time, the output signal from the amplifier 36 becomes substantially zero in magnitude since the potential difference across inputs 37 and 38 is substantially zero. The output amplifier 51 also approaches zero current output. The inputs 77 and 78 of the amplifier 76 are substantially zero. However, the stored control signal in the capacitor 81 cannot discharge since (1) the amplifier 76 yet supplies the desired signal current in its output 79 to the resistor 47 and (2) no current can flow in the resistor 68 to remove the control signal in the capacitor 81. Thus, an automatic "nulling" system brings the output of the amplifier 36 to a zero value, which value is the output signal from the isolation amplifier 36 from which is removed any signal component representing the freely corroding potential present between the test and reference electrode.

In the present corrosion rate meter embodiment, a reference current signal is applied to the input 52 at the current summing point 86 of the output amplifier 51 during "nulling." The reference current signal has a magnitude such that the output current in output 54 of the amplifier 51 has a component representative of the certain polarization potential to be created between the test and reference electrodes. For example, with the switch 67 in the "null" position, a certain output current component is required to flow through the resistor 68 to produce (in addition to the freely corroding potential component) an additional amount representing the certain polarization potential to be established between the test and reference electrodes. More particularly, both current components are integrated into the control signal by the signal correction means 66. As a result, the control signal acting on integrating amplifier 76 provides a correction signal having current components representing the freely corroding potential and also the certain polarization potential. For example, if the certain polarization potential to be established between the test and reference electrodes is 10 millivolts, the correction signal (in "operate") establishes across the resistor 47 a potential equal to 10 millivolts in addition to any freely corroding potential at the electrodes.

The reference current signal applied to the summing point 86 may be obtained from any suitable source. One such source is illustrated in FIG. 5 which will be described hereinafter. The reference current applied to summing point 86 may be obtained from a source of positive and negative reference voltages ($+V_R$ and $-V_R$) selectively applied through a switch 87, a signal lead 88, and switch 89 through a current limiting resistor 91 to the summing point 86. A capacitor 90 shunts switching transients to circuit ground. The switch 87 permits the selection of either a positive or negative reference voltage so that the output amplifier 51 may be regulated in directional output current to produce either a cathodic or anodic polarization of the electrodes. The switch 89 permits a selective application of the reference voltage between "null" and "operate" positions.

In "null" operation, the reference voltage is applied through the resistor 91 to provide the reference current signal applied at summing point 86 and at the input 52 of the amplifier 51. This discrete current signal produces in output 54 a discrete current representing the component of the certain polarization potential which generates a related signal in the resistor 68. Now, the amplifier 76 converts and integrates the additional component into the control signal stored in the capacitor 86. This control signal now produces component currents through the resistor 47 which generate a corrective signal (at input 38 of the amplifier 36) equal to the freely corroding potential and the certain polarization potential to be established between the electrodes. As a result, the output 44 of the amplifier 36 swings voltagewise sufficiently to remove the current component representing the certain polarization potential through resistor 45. This function produces a second output signal in the output 44. The second output signal is representative only of the certain polarization potential to be established between the test and reference electrodes. This second output signal applied through the control impedance 46 removes the reference current signal from the summing point 81 and brings the output current from the amplifier 51 again to substantially zero.

In the particular embodiment of the corrosion rate meter illustrated in FIG. 2, it will be apparent that the amplifier 51 is arranged as a summing amplifier with one input through the control resistor 46 and the second input from the reference current signal applied through the resistor 91. The amplifier 51 is arranged as inverting amplifier so that its output signals are 180° out-of-phase with the current signals applied at the input 52. Similarly, the amplifier 76 is arranged also as an inverting amplifier so that its output signals are 180° out-of-phase to the signal generated in the resistor 68 by output current from the output 54 of the amplifier 51. As a result, the in-phase correction signal generated across the resistor 47 is applied to the inverting input 38 of the amplifier 36 and causes the output 44 to swing voltagewise from the first to the second output signals in such a phase direction as to remove the reference current signal from the summing point 86. The voltage swing in the output signals of the amplifier 36 at output 44 produced by the corrective signal in the resistor 47 will be that precise amount applied through control resistor 46 to extract the reference current signal from the summing point 86 which brings the input 52 of the current amplifier to zero signal input. The output 54 of the amplifier 51 again becomes substantially zero. Thus, the circuitry of FIG. 2 is now in a condition for making the actual corrosion rate measurement.

The switches 67, 71 and 89 are placed into the "operate" position. At such time, the capacitor 81 retains the stored control signal at the input 77. The ampliler 76 again produces the identical current through the resistor 47 to create a correction signal at the input 38 of the amplifier 36 equal to the freely corroding potential and the certain polarization potential to be established between the test and reference electrodes. The inputs 37 and 38 of the current amplifier 36 become unbalanced by the certain polarization potential. As a result, an output signal appears in output 44 of the amplifier 36 and this output signal is applied through the control resistor 46 thereby causing a signal current to appear at the input 52 of the output amplifier 51. This signal produces output current in the output 54 to the electrode 23 connected to terminal A.

This current in the output 54 passes through the second circuit between the test and third electrode 23 and thereby produces a polarization potential between the electrodes 21 and 22. This potential is reflected at the terminals R and T of the circuitry. When the output current in the output 54 is substantially at the magnitude to produce the certain polarizing potential, for example 10 millivolts, both inputs 37 and 38 of the amplifier 36 approached the same potential. Now, the output 44 of the isolation amplifier 36 swings voltagewise to provide a second output signal which is applied through the control resistor 46 to become a current signal at the summing point 86 and the input 52. This current signal controls the amplifier 51 to produce that output current magnitude which generates the certain polarization potential at the electrodes.

As mentioned, the reference current signal applied at the summing point 86 in "nulling" operation calibrates the output signal of the isolation amplifier 36 during "operate" operation of the circuitry so that an identical current signal is provided at the summing point 86 to the input 52 of the output amplifier 51. Thus, irrespective of the load impedance applied to the output 54, the output amplifier 51 produces that output current magnitude to terminal A which is required to produce the certain polarization potential between the test and reference electrodes. It will be apparent that the present circuitry maintains identical relationships between the output signal of the isolation amplifier 36 and the current signals at the input 52 of the current amplifier 51 both in "null" and in "operate" conditions. Thus, there is no change impedance-wise or in relative signal levels in the circuitry between "null" and "operate" conditions. This arrangement provides great operating stability to the present corrosion rate meter.

In "null" operation, the isolation amplifier 36 has a gain of $A_1$ determined by the values of resistor 45 and 47 so that the output signal $E_O$ is equal to the potential difference between the inputs 37 and 38 multiplied by the gain $A_1$. For example, with a 10 millivolt differential between the inputs 37 and 38, the output signal $E_O$ may be $\pm 1$–3 volts.

In "null" operation, the output amplifier 51 has a component gain approximately 20,000. The sum of currents are zero at the summing point 86, which also is at the circuit ground, or common terminal, potential. The output signal $E_O$ applied through the control resistor 46 removes the reference current signal $I_S$ from the input 52. Therefore, the resistor 46 has a value of $E_O$ (volts) divided by $I_S$ (amperes). For example, if $E_O$ is +2.75 volts and the reference current signal $I_S$ is 5.5 microamperes, then resistor 46 has a value of 5,000 ohms.

The reference current signal $I_S$ at input 52 of the output amplifier 51 produces a control signal in capacitor 81 of the signal correction means 66 that causes current through the resistor 47 to produce a corrective signal thereacross which is equal in magnitude to the freely corroding potential between the electrodes 21 and 22 and the certain polarization potential which may be for example, 10 millivolts. The parameter of the signal correction means 66 and related components, especially resistor 47 are selected for this result. Therefore, the output signal $E_O$ has that precise magnitude which applied through the control resistor 46 removes the reference signal current $I_S$ from the summing point 86 and input 52 of the output amplifier 51.

In the "operate" mode of operation, the reference signal current $I_S$ is removed from the summing point 86 while the corrective signal removes from the output signal of isolation amplifier 36 both components representing the freely corroding potential and the certain polarization potential. When current from output 54 of the output amplifier 51 passing from electrode 23 to polarize the electrodes 21 and 22 to the certain polarization potential, the output signal from the isolation amplifier 36 applied through the control resistor 46 produces a current signal at input 52 which controls the output amplifier 51 to produce that current magnitude to effect that certain polarization potential between the reference and test electrodes. This result is obtained since the output signal $E_O$ from the isolation amplifier 36 has a predetermined relationship to the output current in output 54 from the amplifier 51 which relationship is based upon the reference current signal used during "nulling" to calibrate the circuitry. The control of output amplifier with a current, generated voltage signal provides a significant improvement in control efficiency and stability over attempts to provide directly a similar function by altering millivolt magnitude signals in high-gain input circuts of voltage amplifiers.

The voltage loop formed by the high impedance input circuit of the amplifier 36 is isolated from the current loop formed in the output 54 of the output amplifier 51 in the second circuit to the electrode 23. Thus, the terminal T of the circuitry is isolated from the conductor 29 supplying the current to the electrode 21. The inputs 37 and 38 of the isolation amplifier 36 are completely isolated as to resistance-induced potentials from output current in the output 54 of the amplifier 51. As a result, resistance-induced potentials created between the terminals R and T are not influenced by the magnitude of current in the output 54. Therefore, the cable 24 interconnecting the probe 11 to the circuitry of FIG. 2 may be of any length irrespective of the resistance-induced potentials therein. For example, the same resistance-induced potentials appear on conductors 26 and 27 and effectively are applied in series with both R and T terminals of the circuitry. In the voltage loop formed by the input circuit of the isolation amplifier 36, the resistance-created potentials are constant functions merging into the freely corroding potential and do not influence the operation of the isolation amplifier 36.

The current in the output 54 under "operate" conditions may be monitored by any suitable means. Preferably, a readout means measures the output current in the second circuit as it creates the polarizing potential between the test and reference electrodes. This current is correlated, as described in U.S. Pat. 3,406,101, to the corrosion rate occurring at the test electrode 21. It is preferred to employ a readout means which does not change the impedance of the second circuit connected to the electrode 23. For this purpose, a unity gain, voltage follower amplifier 96 can be employed. The amplifier 96 is preferably a differential input, operational amplifier having a first input 97 connected through a signal developing resistor 98 to the second output circuit by the switch 67 to the output 54 of the amplifier 51. The output current produces a voltage signal at the input 97 which has a predetermined relationship thereto. The amplifier 96 produces a corresponding output signal in its output 99. A feedback resistor 101 returns the output 99 to a second input 102. The resistor 101 may have any suitable value so that the overall gain of the amplifier 96 is approximately unity. The output signal in output 99 is applied through a network of resistors 103, 104 and 105 to the common terminal of the present circuitry. An ammeter 106 connected through a calibrating resistor 107 is selectively applied to one terminal of the resistor 103 and to the second output circuit at switch 67. The ammeter 106, with a polarity reversing switch 94 provides a readout of the current flow (cathodic or anodic) in the second circuit connected to the output 54 of the amplifier 51. The amplifier 96 includes the usual trim resistor 108 and a suitable connection to a source current, such as the power supply illustrated in FIG. 4, connected to therminal B+ and B—.

The present corrosion rate meter may be used with a recorder, such as illustrated in FIG. 3 as the readout means. For this purpose, a first recorder output 109 is taken from the junction of resistors 104 and 105. A second recorder output 111, with resistor 110 shunting to common terminal, is taken through a switch 112 in the "operate" position through a resistor 113 to the second circuit from the output 54 of the amplifier 51 which is shunted to the terminal A through range resistor 69 and switch 136 and also to the amplifier 96. The switch 112 connects the recorder output 111 during "null" operation to the output 79 of the signal correction amplifier 76 at the junction of resistors 114 and 116. The network of resistors associated with the switch 112 are voltage dividers to maintain constant output impedance to the recorder at either "null" or "operate" positions.

The recorder 117 may be of any suitable construction, as for example a device which produces a graphic readout on a chart 124 upon receiving a voltage input signal. A recorder such as the Mosley 680 Autograph may be employed. This recorder provides positive and negative input voltage traces on opposite sides of the zero center position. The chart 124 therefore visually illustrates anodic or cathodic corrosion rate depending upon the direction of current in the second circuit from the output 54 of the amplifier 51.

The recorder 117 can produce a trace of the freely corroding potential which is represented by the first output signal from the isolation amplifier 36. The recorder output 111, with the switch 112 in the "null" position, accepts a signal developed across resistors 114 and 116 from the corrective signal provided in the output 79 of the amplifier 76. The corrective signal applied to the resistor 47 has components representative of both the freely corroding potential and also the certain polarization potential to be developed across the electrodes of probe 11. The certain polarization potential component is removed from the recorder input 109 by a compensating signal. For this purpose, the switch 71 in the "null" position connects the input 97 of the amplifier 96 to the source of reference voltage by switch 118 and network resistors 119, 121 and 122. A switch 123 shunts the compensating signal to the common terminal across the resistor 122 during upper range correction signal conditions, which will be desirable hereinafter relative to switch 133. The compensating signal is developed only in "null" operations betwween the resistors 119 and 121 from the reference voltage source. This compensating signal applied to the input 97 of the amplifier 96 removes from the output signal in output 99, that voltage component which represents the certain polarization potential introduced as a reference current signal at the summing point 86. Thus, the recorder outputs 109 and 110 in "null" operation will receive only the corrective signal component representative of the freely corroding potential in current in the output 79 of the amplifier 76. Therefore, the graphic trace in the recorder 117 in "null" operation displays only the freely corroding potential which is present between the test and reference electrodes 21 and 22. The ammeter 106 reads substantially zero since the output current from output 54 reaches substantially zero in "null" operation.

The circuitry of FIG. 2 is adapted to automatic sequence between "null" and "operate," and anodic-cathodic, functioning by operating the switches 67, 71, 89 and 112, and 87, 94 and 118, respectively, from the timer switch controller 33. These switches may be operated by mechanical interconnections or by relays to energize contacts or by SCR rectifiers performing the switch functions. The timer-switch controller 33 is illustrated with the plurality of dashed-lines showing such interconnections to the various mentioned switches. The circuitry may be operated in any combination of functions as is desired. For example, the timer switch controller 33 may be employed to actuate the various recorder switches between null and operate positions (1) with a positive reference voltage creating a reference current signal at the summing point 86 so that the resulting polarization of the electrodes provides an anodic corrosion rate determination and then (2) with a negative reference voltage applied creating the reference current signal at the summing point 86 for a cathodic corrosion rate determination. These functions may be repeated first for the "Meter Prover" and then for the probe 11 connected to the switching assembly 31. In addition to the mentioned functions, a small time delay may be desirable when moving the switches between "operate" and "null" positions so that any residual polarization potential between the electrodes 21 and 22 may decay. Thus, at the beginning of each cycle of operation, only the freely corroding potential will be present between these electrodes when the switches are placed into the "null" position.

With this arrangement of the circuitry functions, the recorder 117 produces a trace such as illustrated by the chart 124 graphically enlarged in FIG. 6. The tracing begins at the top of FIG. 6, and continues with progressing time to the bottom of the chart 124. The chart 124 illustrates this described typical operation of the circuitry shown in FIG. 2.

The terminals R, T, A and Common are connected to the "Meter Prover" at position 2 in the switching assembly 31 in "null" operation. The Meter Prover, as a resistance network, does not have any output voltage signal representative of a freely corroding potential. Therefore, the chart 124 has a zero trace portion 126 for a short period of time, for example, 20 seconds. Now, the timer-switch controller 33 actuates the respective switches into their "operate" position. The Meter Prover provides, in response to output current in the second output circuit from the amplifier 51, a polarization potential (anodic) between terminals R and T representative of a 10 MPY corrosion rate. The amplifier 51 produces that current magnitude which is required to produce the certain polarization potential at a corrosion rate of 10 MPY. This current is monitored on the ammeter 106 while the recorder 117 produces the chart portion 127. Very low capacitance effects at the Meter Prover produce the rounded initial portion of the portion 129. The "operate" position extends for several minutes e.g., three minutes, to insure that a steady-state reading is obtained.

Then, the timer-switch controller 33 actuates the switching arrangement 31 to place the probe 11 into contact with the respective terminals of the circuitry and actuates the respective terminals of the circuitry and actuates the respective switches into their "null" positions. The freely corroding potential between the electrodes 21 and 22 appears at the recorder inputs and is graphically represented by the chart portion 128 extending for a certain desired time interval, for example, 20 seconds. The chart 124 may be calibrated in millivolts so that the freely corroding potential can be read directly. For example, the freely corroding potential may be 20 mv. Now, the timer-switch controller 33 actuates the respective switches into the "operate" position. Upon this occurrence, output current from terminal A and between electrodes 21 and 23 produces the certain polarization potential between the electrodes 21 and 22. The recorder 117 and ammeter 106 provide a readout of this output current which is indicated in chart portion 129 as about 5 MPY. Certain capacitance effects at the probe 11 produces on the curve portion 129, an initial peak portion 131. After a small length of time, an equilibrium condition is reached and the output current becomes steady-state.

Now, the timer-switch controller 33 can repeat the above described functioning. However, switches 87 and 118 are shifted from a positive reference voltage to a negative reference voltage so that the output current from the output 54 of the amplifier 51 produces a cathodic polarization. Thus, the functioning of the circuitry is again repeated through the same sequence of operation but in the cathodic polarization functions and corresponding chart portions are labeled with subscripts $a$. These chart portions follow the same pattern as the anodic polarization chart portions, and for this reason, will not be again described.

Generally, the anodic and cathodic measurements of corrosion rate will produce similar corrosion rates from a given probe 11 and a given corrodent. However, some variations might be encountered. It will be noted that the freely corroding potential represented by portions 128 and 128A in the chart 124 are both cathodic. However, the freely corroding potential may also be anodic in some environments. The present circuitry is not influenced by the magnitude of, or whether, the freely corroding potential is anodic or cathodic. The circuitry of FIG. 2 automatically corrects for the freely corroding potential irrespective of its magnitude or polarity.

It will be apparent that other switching sequences may be practiced in the present circuitry. For example, the timer-switch controller 33 may be arranged to perform a successive measurement of all terminal positions in the switching assembly 31 with each cathodic corrosion rate determination followed by an anodic corrosion rate determinations. The versatility of the present circuitry is such that it is not influenced or limited by any particular desired sequence of operations as long as the timer-switch controller 33 performs the necessary sequencing switching as is desired for this particular functioning.

With the present embodiment of this invention it may be desirable to provide several ranges of corrective signal to be applied to the input 38. For this purpose, a shunting resistance 132 may be selectively placed across resistor 47 to provide a change in corrective signal applied to the input 38 for the same control signal in capacitor 81. A switch 133 removes the shunting resistor 132 from the terminal T to the output 79 of the amplifier 76 when it is desired to change the range of the corrective signal since the impedance of the output 79 is essentially zero. The switch 132 is shown in the low range position. Switching the resistor 132 between the terminal T and the output 79 does not change the impedance of the input 38 of the amplifier 36. Thus, the resistor 132 remains in effective connection to the input 38 without any change in impedance at the input 38. For example, with the resistor shown connected in the lower range position, the correction signal will be able to compensate for a freely corroding potential up to some value, for example 100 millivolts. With the resistor 132 connected to the output 79 of the amplifier 76, the corrective signal may produce sufficient current flow in the resistor 47 to compensate for a freely corroding potential of greater magnitude, for example 500 millivolts. Other arrangements for changing the magnitude of the corrective signal at the input 38 may be employed if desired. The same circuit arrangement is used to shunt the resistor 122 across resistor 121 at the high range so that the recorder 117 reads properly.

As mentioned, the current output from the amplifier 51 may be varied over some definite current range through the use of one value of the reference current signal applied at input 52. Thus, the dynamic range of the readout means, particularly the ammeter 106 and recorder 117 would be required to have a rather compact scale to cover the entire range of corrosion rates. If desired, a plurality of ranging resistors 134 may be placed in parallel with resistor 69 and in series with the second output circuit from the amplifier 51 applied to the terminal A. The proper range resistor may be selected by use of a single-pole, multi-throw switch 136 which can be actuated manually, or by a suitable connection to the timer-switch controller 33. For example, the switch 136 may be operated in any sequence relative to positions 1 through 4 of the switching assembly 31 so that the full scale reading of the ammeter 106 and the recorder chart in the recorder 117 may be set to any desired range, as for example 10 MPY, 100 MPY, 500 MPY, etc. Obviously, adjusting the value of the range resistor determines the polarization potential magnitude effected by certain current flow in the output 54 of the amplifier 51. A capacitor 154 may shunt the range resistors as a voltage filter and to improve impedance matching with probe 11.

A source of direct current for operating the various amplifiers of the present circuitry is shown in FIG. 4. A transformer 137 has a primary connectable to a suitable source of alternating current. The secondary of the transformer 137 is connected to a bridge rectifier 138 and voltage dividing resistors 139 and 141 to provide, at terminals designated B+ and B—, a source of positive and negative operating current. The power supply has Zener diodes 142 and 143 which are shunted by capacitors 144 and 146 to provide a common terminal for the current source. The common terminal of the power supply is floating voltage-wise relative to any actual grounds which may be present or connected to the probe 11. Thus, the common terminal of the power supply is also the terminal Comm. or common terminal of all the circuitry of FIG. 2.

The power supply of FIG. 4 may be employed to provide positive and negative reference voltages by using the circuit shown in FIG. 5. For this purpose, a network resistor series is connected between terminals B+ and B—. This series is formed by fixed resistors 147 and 148 and potentiometers 149 and 151. Zener diodes 152 and 153 are shunted across the potentiometers with a common connection to the common terminal of the power supply. Moveable arms on the potentiometers 149 and 151, respectively, provide the positive and negative reference voltages connectable to the switches 87 and 118 of the circuitry of FIG. 2.

Various modifications and alterations in the described corrosion rate meter, and subcombinations thereof, will be apparent to those skilled in the art from the foregoing description which do not depart from the spirit of the invention. For this reason, these changes in structure are desired to be included in the scope of the present invention. The appended claims define the present invention; the foregoing description is to be employed in setting forth the specific embodiments as illustrative in nature.

What is claimed is:

1. A meter for determining the rate of corrosion by means of polarization measurements in a corrodent which comprises:
    (a) a plurality of electrodes adapted to be placed into contact with a corrodent, said electrodes being a reference electrode, a test specimen electrode and a third electrode;
    (b) an isolation amplifier having an input circuit connected between said reference and test specimen electrodes, said isolation amplifier providing in its output circuit an output signal representative of the potential difference between said reference and test specimen electrodes;
    (c) a source of direct current including an output amplifier having an input connected by a control impedance to the output circuit of said isolation amplifier, said output amplifier having an output circuit selectively connected in a first circuit to a signal correction means and in a second circuit to said test specimen and third electrodes whereby said current creates in the input circuit of said isolation amplifier a polarization potential between said reference and test specimen electrodes in addition to their freely corroding potential, said output amplifier providing in said output circuit thereof a current having a predeterminted relationship to the output signal from said isolation amplifier;
    (d) a source of reference current signal selectively applied to the input of said output amplifier to produce a component in said output circuit of said output amplifier of a current representative of a certain polarization potential between said reference and test specimen electrodes connected in the input circuit of said isolation amplifier;
    (e) signal correction means in said first circuit integrating and storing a corrective signal containing components having a predetermined ratio to the freely corroding potential of said reference and test specimen electrodes connected in said input circuit to said isolation amplifier and said certain polarization potential to be created between said reference and test specimen electrodes;
    (f) said signal correction means associated with said isolation amplifier to apply said corrective signal thereto, said corrective signal adjusting the output signal of said isolation amplifier to remove therefrom a signal component representing the freely corroding potential between said reference and test specimen electrodes, and with the reference current signal applied to said output amplifier connected in said first circuit to said signal correction means, said correction signal producing a first output signal from said isolation amplifier representative of said certain polarization potential between reference and test specimen electrodes, said first output signal applied through said control impedance removing said reference current signal from said input of said output amplifier, and with the reference current signal removed from said output amplifier connected in said second circuit to said test specimen and third electrodes, said corrective signal producing in said output circuit of said isolation amplifier a second output signal from which is removed a signal component representing said freely corroding potential and said certain polarization potential between said reference and test specimen electrodes, and said second output signal applied through said control impedance provides a signal to said input of said output amplifier to control the current in said second circuit to said test specimen and third electrodes to effect the certain polarization potential between said reference and test specimen electrodes in said input circuit of said isolation amplifier; and (g) readout means to measure the current in said second circuit which creates the polarization potential between said reference and test specimen electrodes.

2. The meter of claim 1 wherein said source of reference current signal provides a current representing a polarization potential of about 10 millivolts between said reference and test specimen electrodes in said input circuit of said isolation amplifier.

3. The meter of claim 1 wherein switching means are interconnected therewith for sequentially applying said reference current signal to said input of said output amplifier while said output circuit thereof connects in said first circuit to said signal correction means, and then removing said reference current signal from said input of said output amplifier while said output circuit thereof connects in said second circuit to said test specimen and third electrodes.

4. The meter of claim 1 wherein said reference current signal is derived from a source of reference potential at selectible polarity whereby the current in said output circuit of said output amplifier is controlled in said second circuit to said test specimen and third electrodes to provide selectively anodic and cathodic polarization potentials at said test specimen electrode.

5. The meter of claim 1 wherein said signal correction means includes a signal correction amplifier having an output circuit connected to said isolation amplifier and an input circuit connected in said first circuit to said output circuit of said output amplifier, a feedback circuit between the input and output circuits of said signal correction amplifier including capacitance means for storing a control signal having a predetermined ratio to the current from said output amplifier, said output circuit of said signal correction means including an impedance in said input circuit of said isolation amplifier which produces a corrective signal therein for adjusting the output signal from said isolation amplifier for components representing the freely corroding potential and the certain polarization potential present between said test specimen and reference electrodes when current in said second circuit passes from said output amplifier to said test specimen and third electrodes.

6. The meter of claim 1 wherein said signal correction means includes a means to store a control signal having a predetermined ratio to the current from said output amplifier in said first circuit connection, a signal generating means having an output circuit with an impedance common to said input circuit of said isolation amplifier, and said signal generating mean responsive to said control signal providing in said impedance a corrective signal equal in magnitude to the freely corroding potential and the certain polarization potential created by current from said output amplifier passing in said second circuit connection.

7. A meter for determining the rate of corrosion by means of polarization measurements in a corrodent which comprises:

(a) a plurality of metallic electrodes of substantially identical physical size adapted to be placed into contact with a corrodent, said metallic electrodes including a test specimen electrode, a reference electrode and a third electrode;

(b) an isolation amplifier having an input circuit connected between said test specimen and reference electrodes for providing in its output circuit an output signal representative of the potential difference between said test specimen and reference electrodes;

(c) a source of direct current including an output amplifier having an input connected by a control impedance to the output circuit of said isolation amplifier, and said output amplifier having an output circuit selectively connected in a first circuit to a signal correction means and in a second circuit to said test specimen and third electrodes for passing therebetween a current whereby a polarization potential is created between said test specimen and reference electrodes in addition to their freely corroding potential, said output amplifier in said output circuit thereof providing a current having a predetermined relationship to the output signal from said isolation amplifier;

(d) a source of reference current signal selectively applied to said input of said output amplifier to produce a component in said output circuit of said output amplifier of a current representative of a certain polarization potential between said test specimen and reference electrodes connected in said input circuit of said isolation amplifier;

(e) signal correction means in said first circuit integrating and storing a corrective signal containing components having a predetermined ratio to the freely corroding potential of said test specimen and reference electrodes and said certain polarization potential to be created between said test specimen and reference electrodes;

(f) said signal correction means connected to said isolation amplifier to apply the corrective signal thereto, said corrective signal adjusting the output signal of said isolation amplifier to remove therefrom a signal component representing the freely corroding potential between said test specimen and reference electrodes, and with the refernce current signal applied to said output amplifier connected in said first circuit to said signal correction means, said corrective signal producing a first output signal from said isolation amplifier representative of said certain polarization potential between said test specimen and reference electrodes, said first output signal applied through said control impedance removing said reference current signal from said input of said output amplifier, and with the reference current signal removed from said output amplifier connected in said second circuit to said test specimen and third electrodes, said corrective signal producing in said output circuit of said isolation amplifier a second output signal from which is removed a signal component representing said freely corroding potential and said certain polarization potential between said test specimen and reference electrodes, and said second output signal applied through said control impedance provides a signal to said input of said output amplifier to control the current in said second circuit to said test specimen and third electrodes to effect the certain polarization potential between said test specimen and reference electrodes; and (g) readout means to measure the current in said second circuit which creates the polarization potential between said test specimen and reference electrodes.

8. The meter of claim 7 wherein said source of reference signal current provides polarization potential of about 10 millivolts between said reference and test electrodes in said input circuit of said isolation amplifier.

9. The meter of claim 7 wherein switching means are interconnected therewith for sequentially applying said reference current signal to said input of said output amplifier while said output circuit thereof connects in said first circuit to said signal correction means, and then removing said reference current signal from said input of said output amplifier while said output circuit thereof connects in said second circuit to said test specimen and third electrodes.

10. The meter of claim 7 wherein said reference current signal is derived from a source of potential at selectible polarity whereby the current in the output circuit of said output amplifier is controlled in said second circuit to said test specimen and third electrodes to provide selectively anodic and cathodic polarization potentials at said test specimen electrode.

11. The meter of claim 7 wherein said signal correction means includes a signal correction amplifier having an output circuit connected to said isolation amplifier and an input circuit connected in said first circuit to said output circuit of said output amplifier, a feedback circuit between said input and output circuits of said signal correction amplifier including capacitance means for storing a control signal having a predetermined ratio to the current from said output amplifier, said output circuit of said signal correction means including an impedance in said input circuit of said isolation amplifier which produces a corrective signal therein for adjusting the output signal from said isolation amplifier for components representing the freely corroding potential and the certain polarization potential present between said test specimen and reference electrodes when current in said second circuit from said output amplifier passes to said test specimen and third electrodes.

12. The meter of claim 7 wherein said signal correction means includes a means to store a control signal having a predetermined ratio to the current from said output amplifier in said first circuit connection, a signal generating means having an output circuit with an impedance common to said input circuit of said isolation amplifier, and said signal generating means responsive to said control signal providing in said impedance a corrective signal equal in magnitude to the freely corroding potential and the certain polarization potential created by current from said output amplifier passing in the second circuit connection.

13. A meter for determining the rate of corrosion by means of polarization measurements in a corrodent which comprises:

(a) a plurality of electrodes adapted to be placed into contact with a corrodent, said electrodes being a test specimen electrode, a reference electrode and a third electrode;

(b) an isolation differential input amplifier having first and second inputs connected in a voltage loop circuit between said test specimen and reference electrodes for providing in its output circuit an output signal representative of the potential difference between said test specimen and reference electrodes;

(c) a source of direct current including an output amplifier with differential input having a first input connected through an impedance to said output circuit of said isolation amplifier and a second input connected to said second input of said isolation amplifier, and said output amplifier having an output circuit in a current loop selectively connected in a first circuit to a signal correction means and in a second circuit to said test specimen and third electrodes for passing therebetween a current whereby a polarization potential is created between said test specimen and reference electrodes in addition to their freely corroding potential, said output amplifier providing in said output circuit thereof a current having a predetermined relationship to the output signal from said isolation amplifier;

(d) a source of reference current signal selectively applied to said first input of said output amplifier to produce a component in said output circuit of said output amplifier of a current representative of a certain polarization potential between said test specimen and reference electrodes connected in said input circuit to said isolation amplifier;

(e) signal correction means including a differential input amplifier having first and second inputs and a common output, a feedback circuit including a capacitance means between said first input and said output of said differential input amplifier, an impedance connecting said first input of said differential input amplifier to said first circuit connection with said output circuit of said output amplifier, said impedance generating a signal at the input of said differential input amplifier in said said signal correction means to produce a control signal stored in said capacitance means with said control signal resulting from integrating signals derived from the output current from said output amplifier, and said control signal containing components having a predetermined ratio to the freely corroding potential of said test specimen and reference electrodes and said certain polarization potential to be created between said test specimen and reference electrodes;

(f) said output of said differential input amplifier in said signal correction means including an impedance in said input circuit of said isolation amplifier in which said control signal produces a corrective signal for removing from the output signal of said isolation amplifier a signal component representing the freely corroding potential between the test specimen and reference electrodes, and with the reference current signal applied to said output amplifier connected in said first circuit to said signal correction means, said corrective signal producing a first output signal from said isolation amplifier representative of said certain polarization potential between said test specimen and reference electrodes, said first output signal applied through said impedance between said isolation and output amplifiers removing said reference current signal from the said first input of said output amplifier, and with the reference signal current removed from said output amplifier connected in said second circuit to said test specimen and third electrodes, said corrective signal producing in said output circuit of said isolation amplifier a second output signal from which is removed a signal component representing said freely corroding potential and said certain polarization potential between said test specimen and reference electrodes, and said second output signal applied through said impedance between said isolation and output amplifiers provides a signal to said first input of said output amplifier to control the current in said second circuit passing to said test specimen and third electrodes to effect the certain polarization potential between said test specimen and reference electrodes; and (g) readout means to measure the current in said second circuit which creates the polarization potential between said test specimen and reference electrodes.

14. The meter of claim 13 wherein said output of said differential input amplifier in said signal correction means and said impedance common to said input circuit of said isolation amplifier provide an isolated current loop in said first and second circuit connections of said output amplifier and source of direct current.

15. The meter of claim 13 wherein said test specimen and third electrodes are connected in a current loop circuit in said second circuit from said output amplifier and said test and reference electrodes in said voltage loop in said input circuit of said isolation amplifier are isolated from said current loop circuit connected to said test specimen and third electrodes by a voltage follower arrangement of said isolation amplifier whereby resistance-induced potentials in said voltage loop circuit are independent of the flow of current in said current loop circuit.

16. The meter of claim 13 wherein said readout means includes means for correcting the current to be measured for the certain polarization potential component when said output amplifier connects to said first circuit whereby said readout means provides a measurement of said freely corroding potential between said test specimen and reference electrodes.

References Cited
UNITED STATES PATENTS

| | | | |
|---|---|---|---|
| 3,069,332 | 12/1962 | Seyl | 204—195 |
| 3,156,631 | 11/1964 | Seyl | 204—195 |
| 3,250,689 | 10/1966 | Seyl | 204—195 |
| 3,406,101 | 10/1968 | Kilpatrick | 204—1 T |

TA-HSUNG TUNG, Primary Examiner

U.S. Cl. X.R.

204—1 T; 324—71 C

UNITED STATES PATENT OFFICE
CERTIFICATE OF CORRECTION

Patent No. 3,661,751          Dated    May 9, 1972

Inventor(s)   Homer M. Wilson

It is certified that error appears in the above-identified patent and that said Letters Patent are hereby corrected as shown below:

Column 1, line 70, for "were", read ---where---;
Column 3, line 43, for "polyarization", read ---polarization---;
Column 5, line 34, cancel ". With" and substitute therefor ---and---
Column 5, line 45, for "veiw", read ---view---;

Column 6, line 10, cancel "or" first occurrence;
Column 10, line 2, cancel "86" and substitute therefore ---81---;
Column 10, line 16, cancel "81" and substitute therefor ---86---'
Column 10, line 46, for "ampliler", read ---amplifier---;
Column 12, line 53, for "therminal", read ---terminal---;
Column 13, line 25, for "betwween", read ---between---;
Column 16, lines 49-50, cancel "predeterminted" and substitute therefor
    ---predetermined---;
Column 18, line 50, for "refernce", read ---reference---; and
Column 20, line 22, cancel "said" second occurrence.

Signed and sealed this 7th day of November 1972.

(SEAL)
Attest:

EDWARD M. FLETCHER, JR.                    ROBERT GOTTSCHALK
Attesting Officer                          Commissioner of Patents